Aug. 6, 1968 S. VISNER 3,396,078
FUEL ARRANGEMENT FOR FAST BREEDER REACTOR
Filed Dec. 23, 1966 3 Sheets-Sheet 1

☐ = FUEL
▨ = BLANKET

INVENTOR
SIDNEY VISNER
By Richard H. Berneike
ATTORNEY

INVENTOR
SIDNEY VISNER

Aug. 6, 1968   S. VISNER   3,396,078
FUEL ARRANGEMENT FOR FAST BREEDER REACTOR
Filed Dec. 23, 1966   3 Sheets-Sheet 3

☐ = FUEL
▨ = BLANKET

INVENTOR
SIDNEY VISNER
By Richard H Bernecke
ATTORNEY

United States Patent Office 3,396,078
Patented Aug. 6, 1968

3,396,078
FUEL ARRANGEMENT FOR FAST
BREEDER REACTOR
Sidney Visner, West Hartford, Conn., assignor to Combustion Engineering, Inc., Windsor, Conn., a corporation of Delaware
Filed Dec. 23, 1966, Ser. No. 604,478
12 Claims. (Cl. 176—17)

ABSTRACT OF THE DISCLOSURE

A fuel arrangement for a fast breeder reactor to lower or make negative the coolant void or coolant density coefficient of reactivity. The core fuel material and the blanket breeding material are arranged in a three dimensional checkerboard so as to provide enhanced neutron leakage from the fuel material to the blanket material upon a reduction in the coolant density or a voiding of the coolant.

Background of the invention

Due to limited availability of U-235, there has been an increased interest during recent years in nuclear power reactors having the capability of producing fissionable fuel. These reactors, known as fast breeder reactors, convert fertile material such as thorium and U-238 to the fissionable materials U-233 and Pu-239, respectively. In water cooled reactors, the water in the core serves as both a coolant and a moderator so that with a complete water loss there is a corresponding moderator loss and a decrease in the reactivity. Fast breeder reactors, of course, have very little if any moderating materials so that most of the fissions are produced by fast neutrons. The most common coolants for fast breeder reactors are the liquid light metals such as liquid sodium. When a void occurs in the coolant or the coolant density is drastically reduced, there is a consequent hardening of the neutron energy spectrum, i.e. an increase in the average energy of the neutrons. This spectral hardening in turn results in an increased eta for the fuel, i.e. an increased average number of neutrons produced per neutron absorbed in the fuel. This factor plus the decreased absorption of neutrons in the coolant will inherently tend to give a positive coolant voiding or density coefficient of reactivity. Unless these effects can be overcome by other factors, the over-all coefficient will be positive, thus creating a safety hazard.

The effects of spectral hardening and the increased eta can be overcome to produce a negative coefficient if there is a significant increase in the neutron leakage from the fuel material upon coolant removal. The term coolant removal is employed to represent both coolant voiding and a decrease in coolant density. In relatively small fast breeder reactors, there is normally appreciable neutron leakage which is increased by the coolant removal, thus giving a negative coefficient. However, in large fast breeder reactors the neutron leakage effect is less important and the increase in neutron energy and eta predominate to give a net increase in the reactivity. To overcome this effect, provision must be made to increase the leakage effect by proper core and blanket arrangements. One such suggestion is to increase the volume fraction of coolant within the reactor core thus enhancing the leakage effect. Such a design, however, offers limited improvement in the reactivity coefficient and results in a decreased fuel density and decreased breeding.

The principal reactor component into which the neutrons may leak upon coolant removal is the blanket or breeding material. In conventional fast breeder reactor designs this blanket material surrounds the core material and there can be little leakage from interior portions of the core to the remote blanket material. One solution which has been suggested in the prior art is to employ a plurality of subcritical cores nuclearly coupled by blanket or fertile material deposited therebetween. This comprises a plurality of slabs containing fuel material separated by slabs containing blanket or fertile material. See U.S. Patent 3,140,234 issued July 7, 1964, to W. B. Loewenstein. Such a design, however, provides for leakage from the fuel material in two directions only, up and down for instance. The present invention proposes to solve the problem in a somewhat similar but more effective manner by employing a three dimensional checkerboard fuel and blanket arrangement such that the neutron leakage from each fuel region may take place in all directions. The proposed method is also more effective in enhancing neutron leakage in that the probability of return of a neutron from a blanket to the same core region from which it came is reduced, relative to the slab arrangement, because the geometrical aspect of the core region as seen from the blanket is smaller.

It is accordingly an object of the present invention to provide a fuel and blanket arrangement for a large fast reactor which will have a negative coolant removal coefficient.

Brief description of the drawings

The invention will be described in connection with the accompanying drawings wherein.

Description of the preferred embodiments

Figure 1:
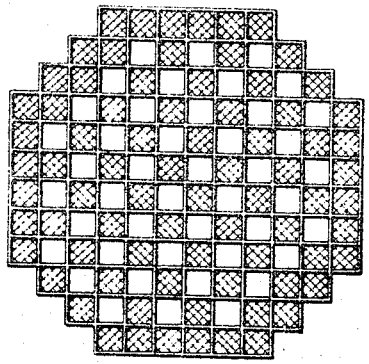
FIG. 1 is a schematic horizontal section view of a reactor core.
Figure 2:
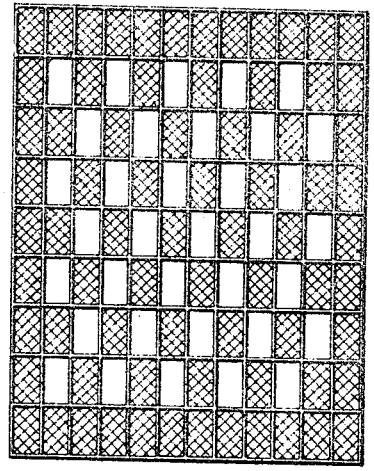
FIG. 2 is a schematic vertical section view of a reactor core.

The over-all core arrangement according to the present invention can be readily seen from FIGS. 1 and 2. These figures schematically illustrate horizontal and vertical cross sections, respectively, of the core and show the alternate arrangement of the fissile and fertile material in both the horizontal and vertical directions. Each square in FIG. 1 and each vertical column in FIG. 2 represents what might in actuality be a fuel assembly each of which might be composed of a plurality of fuel rods as will be discussed hereinafter. It can be readily seen from these two figures that the fuel or fissile regions are each surrounded by fertile regions (cross hatched) above and below as well as on all sides. Thus neutrons from any fuel region can readily leak in all directions into fertile regions due to the relatively short path of travel to such regions. It can also be readily seen from FIGS. 1 and 2 that the top and bottom of the reactor core are covered by axial blankets and that the entire outer perimeter of the core is likewise composed of blanket material.

Figure 4:
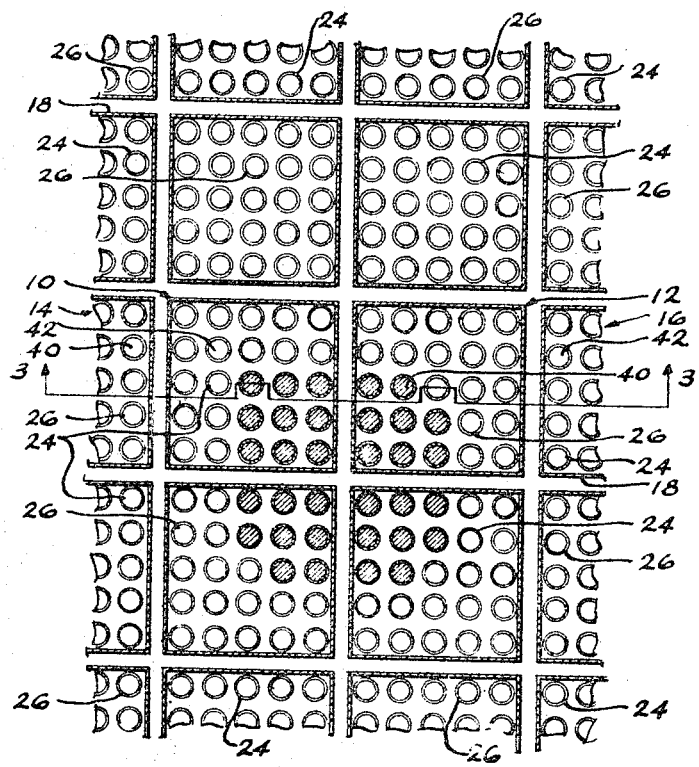
FIG. 4 is a horizontal cross section of a portion of a reactor core taken along line 4—4 of FIG. 3.
Figure 3:
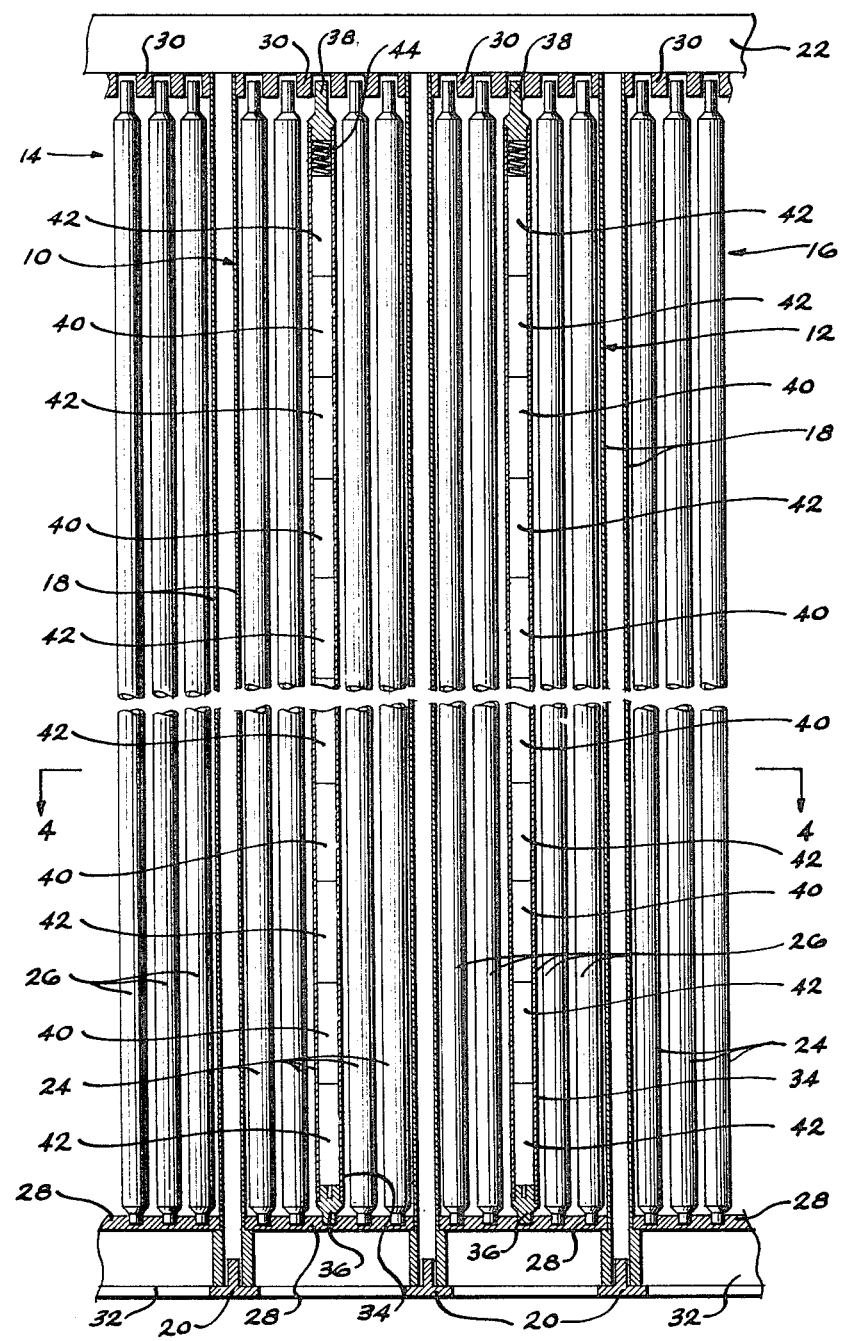
FIG. 3 is an elevation view in section illustrating adjacent fuel assemblies or bundles comprising a portion of a reactor core taken along line 3—3 of FIG. 4.

Referring now to FIG. 3, there are illustrated two adjacent fuel assemblies or bundles 10 and 12 as well as portions of two other fuel assemblies 14 and 16. Fuel assemblies 10 and 16 are what will be referred to as type A fuel assemblies while 12 and 14 are what will be referred to as type B assemblies. Each fuel assembly comprises a casing 18 enclosing the fuel rods and supporting the fuel assemblies between the reactor's lower support grid plate 20 and upper hold-down grid structure 22. FIG. 4 illustrates a cross section along line 4—4 of FIG. 3. Type A fuel assemblies 10 and 16 contain a plurality of fuel rods 24 also of type A while type B fuel assemblies 12 and 14 contain a plurality of fuel rods 26 of type B. These fuel rods are supported in the assemblies by the lower support plates 28 and upper support plates 30. A plurality of spacer bands (not illustrated) may be located at intervals along the length of the fuel rods 24 and 26 to insure the proper spacing and rigidity of the rods in the fuel assemblies. In operation, the coolant flows upwardly through the apertures 32 in the lower grid support plate 20 and then upwardly through the fuel assemblies around the fuel rods therein to extract the heat.

The details of and differences between the type A fuel element 24 and the type B fuel element 26 can be seen from the broken away vertical cross section view of two of the elements in FIG. 3. Each of these fuel rods consists of a cylindrical tube 34, a lower end cap 36, and an upper end cap 38. Each of the fuel rods contains a plurality of fuel or fissile pellets 40 and blanket or fertile pellets 42 which are maintained in place by means of springs 44. Each of the fuel rods has a fertile pellet at each end and these collectively act as the axial blankets for the entire core. The remaining pellets in each of the fuel rods alternate between fuel and fertile material as indicated. Pellets 40 and 42 may be further subdivided into a plurality of identical pellets stacked together if desired. The type A fuel rod has a fuel pellet 40 immediately adjacent the top axial blanket pellet while the type B fuel rod has another fertile or blanket pellet 42 adjacent the top axial blanket pellet. It can thus be seen from FIGS. 3 and 4 that when the type A and B fuel rods are incorporated into alternate fuel assemblies, a fuel region in one assembly will be directly adjacent to a fertile region in the adjacent assembly. Thus neutrons from any fuel region can leak either up or down into a fertile region within the same fuel assembly or horizontally into a fertile region in the adjacent fuel assembly. The fuel assemblies on the perimeter of the core may be composed partially or entirely of fuel elements containing only fertile materials throughout their length to provide the radial blanket. This radial blanket may, of course, be of a thickness such that several of the outer assemblies will contain only blanket material.

It is obvious that the fuel and fertile regions as depicted in FIGS. 1 and 2 need not be integral but may be composed of separate assemblies grouped together to make up each of the desired fuel and fertile regions. For instance, a plurality of fuel assemblies of type A and a plurality of fuel assemblies of type B can be grouped together to form the three dimensional checkerboard with core and blanket regions of a larger size. The dimensions of these regions might be of the order of 6 to 36 inches on a side. In contrast to this arrangement, fuel rods of type A and type B may both be grouped together within each of the fuel assemblies such that the various regions will cooperate upon assembly into the core to provide regions of the desired size and configuration.

The fuel and blanket pellets as illustrated in the brokenaway fuel elements in FIG. 3 are not necessarily in the proper size relationship with respect to the fuel elements and fuel assemblies. Although the axial length of the fuel and blanket pellets and regions may vary considerably, it is anticipated that each of these pellets and regions will be on the order of 6 to 12 inches high while each fuel rod may be only about one half inch in diameter. It should be pointed out that the number of fuel elements in each of the fuel assemblies has been limited in the drawings for purposes of clarity. Although the number of such fuel elements in each assembly can also be varied considerably, it is anticipated that there might be on the order of 144 per assembly. Such an assembly might measure anywhere from 6 to 12 inches on a side. It should further be pointed out that the fuel and blanket material within each fuel rod or assembly may be in any desired form. The only requirement is that the fuel and blanket material be capable of maintaining their proper positions such that the proper regions will be maintained.

The fuel and blanket arrangement of the present invention has additional advantages over other prior art arrangements to achieve a negative coefficient in a fast breeder reactor. In prior art arrangements where the fuel and fertile material is arranged in separate zones which extend from the top to the bottom of the core, there is the problem of changing heat output within the fuel and blanket sections during the life of the core. Initially there is a large heat output from the fuel regions and very little heat output from the blanket regions. If full flow of the coolant were permitted through both the fuel and blanket regions, there would initially be a loss of efficiency due to the low exit temperature of the coolant from the blanket region. As time progressed, fuel such as plutonium would be bred within the blanket region and the heat output would increase. Thus if the coolant flow through these regions were initially restricted, it would be necessary to make provisions for increasing the flow as the fissionable material is produced. Schemes for adjusting this coolant flow are of necessity quite complicated and expensive.

In contrast to the above, the present invention overcomes the problem of varying heat output between the fuel assemblies. In the present design the heat output variation between fuel and fertile regions will vary within each section within a fuel assembly rather than vary between fuel assemblies. Therefore, if there is any net change in the heat output, it will, in general, vary somewhat uniformly between the assemblies such that the coolant flow need not be varied throughout the life of a core. It must be realized, of course, that the heat output would not be absolutely uniform particularly if the fuel cycling procedure replaces only a portion of the fuel assemblies at a time.

With certain core designs employing the present invention, it may be desirable and perhaps necessary to incorporate some moderating material. This moderating material, which may be of any desired form such as carbon (graphite) or beryllium, should preferably be incorporated into the blanket regions. This moderating material tends to degrade the neutron energy upon leakage into the fertile regions and increase the number of neutrons in the energy range of 10–100 kv. This will tend to make these neutrons less important to the chain reaction and increase the Doppler effect. This results in an increased neutron absorption with increasing temperatures thus contributing to the negative coefficient. The amount of moderator which may be added can be varied somewhat but might be on the order of 10% of the blanket material. This moderating material can be incorporated into the core and into the blanket material in any desired manner such as by intimately mixing the fertile and moderating materials. A preferred method, however, would be to maintain the fertile and moderating materials separate such as by filling some of the fuel elements within a fuel assembly entirely with moderator. This can be most readily accomplished by having the entire outer row of fuel elements within a fuel assembly filled with moderating material. This will provide a moderating barrier between the fuel regions in one assembly and the fertile regions in the adjacent assembly. Another possible arrangement of moderator would be to incorporate an annular moderator sleeve around each blanket pellet or to place a moderating insert into an annular blanket pellet.

Figure 5:
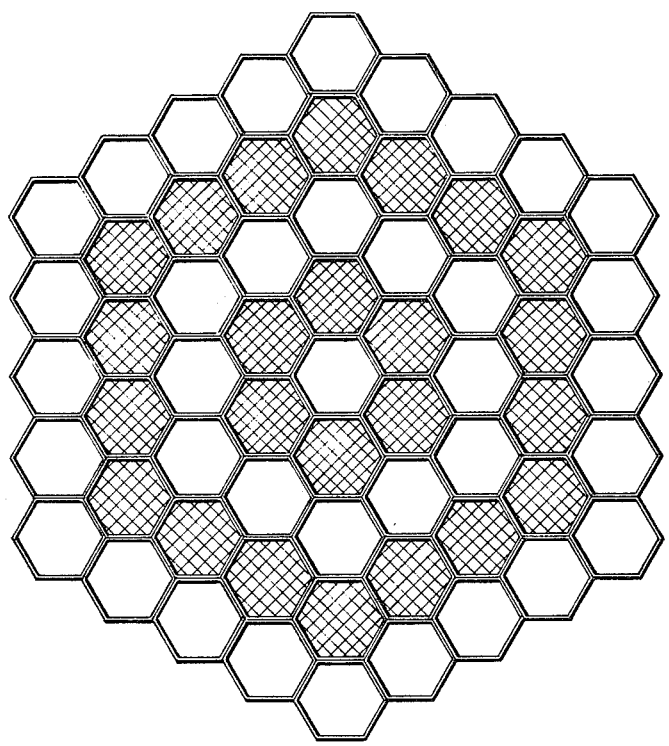
FIG. 5 is a schematic horizontal section view of a reactor core incorporating hexagonal fuel assemblies.

Although the present invention has been particularly described with respect to a core consisting of fuel assemblies with square cross sections, it is to be realized that the invention is not so limited. FIG. 5 schematically illustrates a horizontal cross section of a core consisting of hexagonal fuel assemblies which also incorporates the basic concepts of the present invention. Although each of the fuel regions is not completely surrounded by blanket regions, they are on at least 4 of the 6 sides which contributes greatly to the negative coefficient. The fuel rods in each of these assemblies also contain alternate type A and type B pellets so that each internal core region is surrounded top and bottom by an internal blanket region, as illustrated in FIG. 2. It must also be realized that the invention is not limited to cores consisting of fuel assemblies containing a plurality of separate fuel element tubes. Other core constructions could just as readily incorporate the present invention.

While preferred embodiments of the invention have been illustrated and discussed, it will be understood that these are merely illustrative and that changes may be made without departing from the spirit and scope of the invention as claimed.

I claim:

1. A fast breeder nuclear reactor core comprising a plurality of a fissile and fertile regions containing fissile and fertile material, respectively, wherein said fissile and fertile regions are arranged substantially in checkerboard fashion in both the horizontal and vertical directions whereby each fissile region is substantially surrounded by fertile regions in both the horizontal and vertical directions.

2. A fast breeder nuclear reactor core as claimed in claim 1 and further including additional zones containing fertile material surrounding said core and forming axial and radial blankets.

3. A fast breeder nuclear reactor core as claimed in claim 2 and further including moderator material in associated with at least some of said fertile regions.

4. A fast breeder nuclear reactor core comprising a plurality of fertile regions containing fertile material and a plurality of fissile regions containing fissile material, said fertile and fissile regions being arranged in said core in a three dimensional checkerboard fashion.

5. A fast breeder nuclear reactor core comprising a plurality of vertically extending fuel assemblies, each of said fuel assemblies containing a plurality of separate fertile and fissile regions, said fertile and fissile regions alternating in a vertical direction along the length of said fuel assemblies, adjacent fuel assemblies of said plurality having fertile and fissile regions in alternating positions whereby a fertile region in one fuel assembly is adjacent to a fissile region in an adjacent fuel assembly.

6. A fast breeder nuclear reactor core comprising a plurality of longitudinally extending fuel assemblies, said fuel assemblies each comprising a plurality of longitudinally extending fuel elements, each of said fuel elements containing both fertile and fissile material alternately arranged along the length of said fuel elements thereby forming fertile and fissile zones within said fuel elements, the fertile zones of said elements within each fuel assembly being adjacent each other and the fissile zones of said fuel elements within each fuel assembly being adjacent each other thus forming alternating fertile and fissile zones along the length of said fuel assemblies, said fuel assemblies arranged in said reactor core such that said fissile zones of said fuel assemblies are adjacent to said fertile zones of adjacent fuel assemblies.

7. A fast breeder nuclear reactor core as claimed in claim 6 wherein said fuel assemblies further comprise a plurality of longitudinally extending moderator elements containing moderator material.

8. A fast breeder nuclear reactor core as claimed in claim 7 wherein said moderator elements are located around the perimeter of said fuel assemblies.

9. A fast breeder nuclear reactor core comprising a plurality of longitudinally extending fuel assemblies, said fuel assemblies containing both fertile and fissile material alternately arranged longitudinally of said fuel assemblies thereby forming alternate fertile and fissile zones with said fuel assemblies, a first group of said fuel assemblies having said fertile and fissile zones in a first predetermined position and a second group of said fuel assemblies having said fertile and fissile zones in a second predetermined position opposite from said first predetermined position, said fuel assemblies being positioned in said core whereby each fuel assembly of said first group is adjacent to at least one fuel assembly of said second group.

10. A fast breeder nuclear reactor core as claimed in claim 9 wherein each fuel assembly of said first group has four fuel assemblies of said second group adjacent thereto and wherein each fuel assembly of said second group has four fuel assemblies of said first group adjacent thereto.

11. A fast breeder nuclear reactor core as claimed in claim 9 wherein said fuel assemblies are of hexagonal cross section.

12. A fast breeder nuclear reactor core as claimed in claim 10 wherein said fuel assemblies are of substantially square cross section.

References Cited

UNITED STATES PATENTS

| 3,141,827 | 7/1964 | Iskenderian | 176—40 |
| 3,154,471 | 10/1964 | Radkowsky | 176—17 |
| 3,335,060 | 8/1967 | Diener | 176—17 |

FOREIGN PATENTS

| 853,269 | 11/1960 | Great Britain. |

CARL D. QUARFORTH, *Primary Examiner.*

H. E. BEHREND, *Assistant Examiner.*